(12) United States Patent
Doan et al.

(10) Patent No.: US 12,503,944 B2
(45) Date of Patent: Dec. 23, 2025

(54) METHOD OF MACHINING TURBINE COMPONENTS USING A REFERENCE SURFACE

(71) Applicant: GE Infrastructure Technology LLC, Greenville, SC (US)

(72) Inventors: Quyen Doan, Greenville, SC (US); Richard David Coen, Greenville, SC (US); Brently A. Lord, Inman, SC (US)

(73) Assignee: GE INFRASTRUCTURE TECHNOLOGY LLC, Greenville, SC (US)

( * ) Notice: Subject to any disclaimer, the term of this patent is extended or adjusted under 35 U.S.C. 154(b) by 126 days.

(21) Appl. No.: 18/475,650

(22) Filed: Sep. 27, 2023

(65) Prior Publication Data

US 2024/0110481 A1 Apr. 4, 2024

Related U.S. Application Data

(60) Provisional application No. 63/411,531, filed on Sep. 29, 2022.

(51) Int. Cl.
*F01D 5/00* (2006.01)
*B23P 6/00* (2006.01)

(52) U.S. Cl.
CPC .............. *F01D 5/005* (2013.01); *B23P 6/002* (2013.01); *F05D 2230/237* (2013.01); *F05D 2230/80* (2013.01)

(58) Field of Classification Search
CPC ..... B23P 6/005; Y10T 29/49318; F01D 5/005
See application file for complete search history.

(56) References Cited

U.S. PATENT DOCUMENTS

| 4,554,495 | A | 11/1985 | Davis |
| 7,351,290 | B2 | 4/2008 | Rutkowski et al. |
| 8,220,150 | B2 * | 7/2012 | Pellet ..................... B23P 6/002 |
| | | | 29/889 |
| 8,544,173 | B2 * | 10/2013 | Miller ..................... F01D 5/005 |
| | | | 29/888.021 |
| 10,947,849 | B2 * | 3/2021 | Karigiannis ............ F01D 5/005 |
| 11,103,963 | B2 * | 8/2021 | Beers .................. F04D 29/4206 |
| 2016/0199950 | A1 | 7/2016 | Bilhe et al. |
| 2017/0009584 | A1 | 1/2017 | Cui et al. |
| 2017/0038760 | A1 | 2/2017 | Compagnat et al. |

(Continued)

OTHER PUBLICATIONS

International Search Report and Written Opinion for PCT/US2023/075392.

*Primary Examiner* — Sarang Afzali
(74) *Attorney, Agent, or Firm* — Armstrong Teasdale LLP

(57) ABSTRACT

A method of repairing a turbine blade includes positioning the turbine blade within a system including a machining tool and determining a first distance between a surface of a first pre-sintered preform (PSP) attached to a tip shroud of the turbine blade and a datum surface formed in the tip shroud. The method also includes removing the first PSP from the tip shroud, coupling a second PSP to the tip shroud, and machining a surface of the second PSP using the machining tool. Machining the second PSP surface includes controlling movement of the machining tool using the datum surface as a reference, such that the machined second PSP surface is located the first distance from the datum surface.

7 Claims, 5 Drawing Sheets

(56) References Cited

U.S. PATENT DOCUMENTS

2018/0371914 A1   12/2018  Karigiannis et al.
2021/0308761 A1*  10/2021  Ozbaysal ........... B23K 35/0244
2022/0145765 A1    5/2022  Navale et al.

* cited by examiner

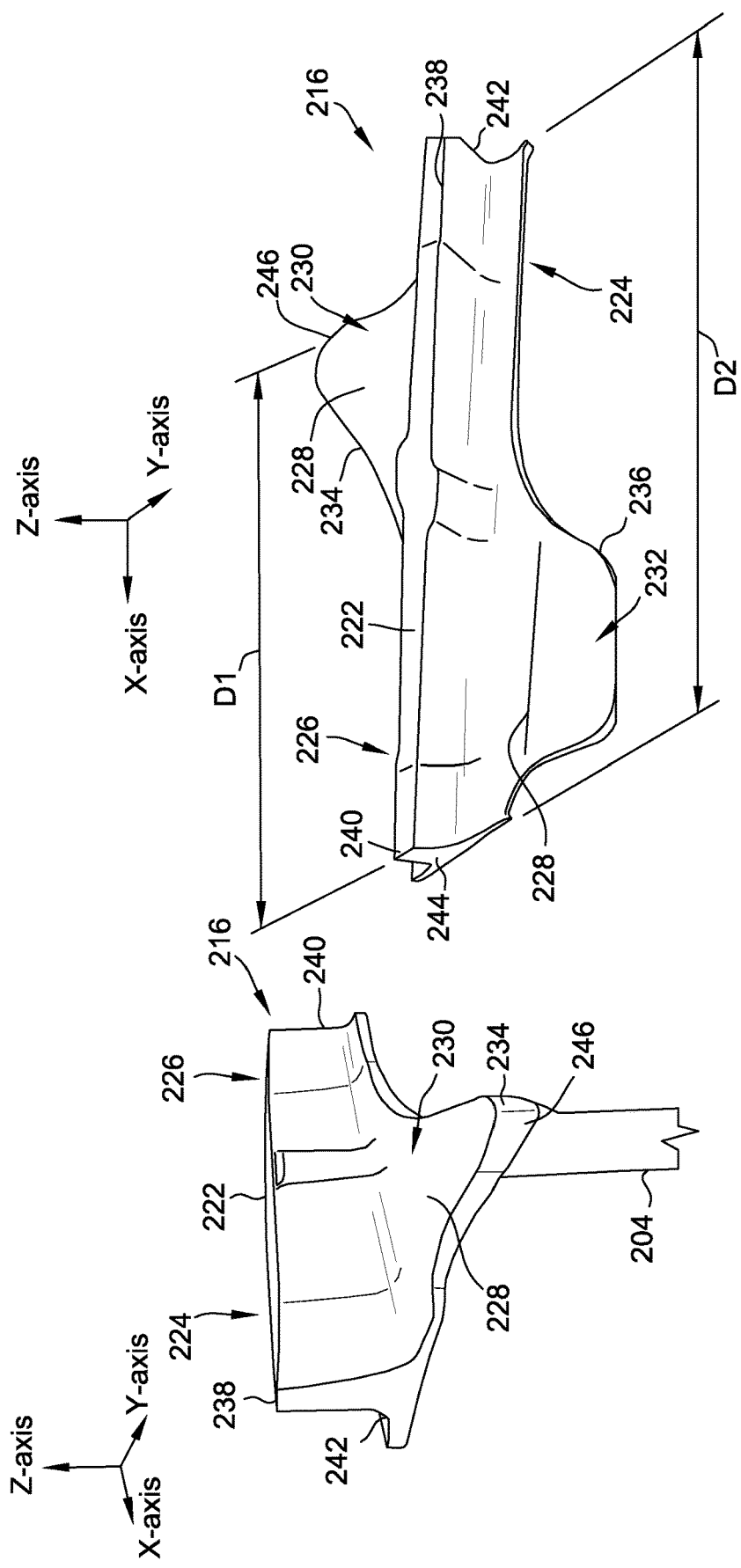

METHOD OF MACHINING TURBINE COMPONENTS USING A REFERENCE SURFACE

CROSS-REFERENCE TO RELATED APPLICATION

This application claims priority to U.S. Provisional Patent Application No. 63/411,531, filed Sep. 29, 2022, the disclosure of which is hereby incorporated herein by reference in its entirety.

BACKGROUND

The field of the disclosure relates generally to turbine blades used with rotary machines, and more particularly to methods of manufacturing and repairing turbine blades having a pre-sintered preform layer wherein a reference surface is used for machining the pre-sintered preform layer.

At least some known rotary machines include at least one rotor assembly coupled to a rotor shaft. The rotor assembly includes a plurality of circumferentially-spaced blades that extend radially outward towards a stationary casing that defines a portion of a hot gas flow path through the rotary machine. A plurality of stationary vanes (or nozzles) are coupled to the casing in a circumferential array such that the stationary vanes extend radially inwardly into the flow path. The stationary vanes and rotating blades are arranged in alternating rows such that a row of vanes and the immediate downstream row of blades form a "stage" of the rotary machine. The vanes direct the hot gas flow towards the downstream row of blades wherein the blades extract energy from the flow, thereby developing the power necessary to drive a rotor and/or an attached load, e.g., a generator. For example, but not by way of limitation, the rotor assembly may be part of a steam turbine, or part of a compressor or turbine section of a gas turbine engine.

Some turbine hot gas path components may include one or more sheets of material applied over a portion or portions of the underlying component. For example, during pre-sintered preform (PSP) fabrication, one or more sheets of material are brazed onto at least some turbine components, such as a shrouded blade or a nozzle. The PSP sheets are usually overlaid across the component, and then brazed onto the component to form an external surface. Typically, the sheets are substantially flat or include a curvature that is generally similar to the overall geometry of the component surface to which they become attached, although, through pressure, bending, and the like, these flat sheets may be conformed to the underlying component surface during the attachment process.

At least some turbine components include shrouds at the outer extremity of the airfoil. The shrouds are typically designed with an interlocking feature which enables each component to be interlocked at its shroud with an immediately-adjacent component when such components are installed about the circumference of a turbine disk. This interlocking feature assists in preventing the airfoils from vibrating, thereby reducing the stresses imparted on the components during operation.

Turbine hot gas path components are typically made of nickel-based superalloys or other high temperature superalloys designed to retain high strength at high temperature. However, the material used in fabricating the shroud of the turbine component and the interlocking feature may not be of a sufficient hardness to withstand prolonged exposure to the wear stresses and/or rubbing that may occur during start-up and shut down of a turbine engine. To improve the wear at these locations, a hardface pre-sintered preform (PSP) may be brazed or welded to the component to serve as a wear surface. The hardface material protects each respective component and associated shroud from wear arising from frictional contact during operation, when the turbine components are under centrifugal, pressure, thermal, and/or vibratory loading.

Conventional fabricating and/or reconditioning of a turbine component including a hardface PSP typically requires removing an existing PSP from the component, re-brazing or re-welding a new hardface PSP onto the component, and machining the new hardface PSP to a targeted profile. Machining the hardface PSP is typically performed using a multi-axis computer numerically controlled (CNC) unit. CNC units enable movement of the cutting tool along a number of axes, including X-, Y-, and Z-axes, as well as rotational axes. In machining the hardface PSP, movement of the CNC unit is guided by a coordinate system that relies on data gathered from the component to ensure the targeted profile of the hardface PSP is achieved.

Typically, a separate location on the component (e.g., a midspan shroud) is used as an origin (a reference point) and relative rotation and/or translation of a portion of the component to which the hardface PSP is applied (e.g., a tip shroud of the airfoil) is calculated relative to the origin in order to derive a coordinate system for guiding the CNC unit. The data is gathered and saved prior to removing an existing PSP. After the new hardface PSP is applied, the reference point is probed and the saved data is analyzed to determine final translation and rotation derived from coordinate system transformation to guide the CNC unit in machining the new PSP. Conventional processes such as these may be limited as the process relies on the use of reference points that are not located on the portion of the component to which the PSP is applied. As such, during the process deriving translational and rotational data from the coordinate system transformation requires a fairly high degree of accuracy of the same location on the component during the initial and final machining, and during data saving. Errors in machining the hardface PSP may be amplified due to indirect or inaccurate locating, multiple probing, transformation, and/or errors in data saving.

Accordingly, there is a need to simplify manufacturing and/or reconditioning turbine components that include machining pre-sintered preforms, such that the process can be duplicated and such that the above-described problems are reduced and/or eliminated.

BRIEF DESCRIPTION

In one aspect, a method of repairing a turbine blade is provided. The turbine blade includes a tip shroud and a first pre-sintered preform (PSP) attached to the tip shroud. The method includes positioning the turbine blade within a system including a machining tool; determining a first distance between a surface of the first PSP and a datum surface formed in the tip shroud; removing the first PSP from the tip shroud; coupling a second PSP to the tip shroud; and machining a surface of the second PSP using the machining tool, wherein machining the second PSP surface comprises controlling movement of the machining tool using the datum surface as a reference, such that the machined second PSP surface is located the first distance from the datum surface.

In another aspect, a method of repairing a turbine component is provided. The turbine component includes a first hardface structure and a second hardface structure. The method includes positioning the turbine component within a system including a machining tool; determining a first distance between a surface of the first hardface structure and a datum surface formed in the turbine component; removing the first and second hardface structures from the turbine component; coupling a third hardface structure to the turbine component and a fourth hardface structure to the turbine component; machining a surface of the third hardface structure using the machining tool, wherein machining the third hardface structure surface comprises controlling movement of the machining tool using the datum surface as a reference, such that the machined third hardface structure surface is located the first distance from the datum surface; and machining, using the machining tool, a surface of the fourth hardface structure to a second distance measured between the machined third hardface structure surface and the machined fourth hardface structure surface.

In another aspect, a method of repairing a turbine blade is provided. The turbine blade includes a tip shroud, and a first pre-sintered preform (PSP) and a second PSP attached to the tip shroud. The method includes positioning the turbine blade within a system including a machining tool; controlling the machining tool to machine a datum surface in the tip shroud; removing the first and second PSPs from the tip shroud; coupling a third PSP and a fourth PSP to the tip shroud; controlling the machining tool to machine the third PSP using the datum surface as a reference; and controlling the machining tool to machine the fourth PSP after machining the third PSP.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIGS. 3 and 4 are front and rear perspective views, respectively, of a tip shroud of the turbine blade of FIG. 2;

Figure 1:
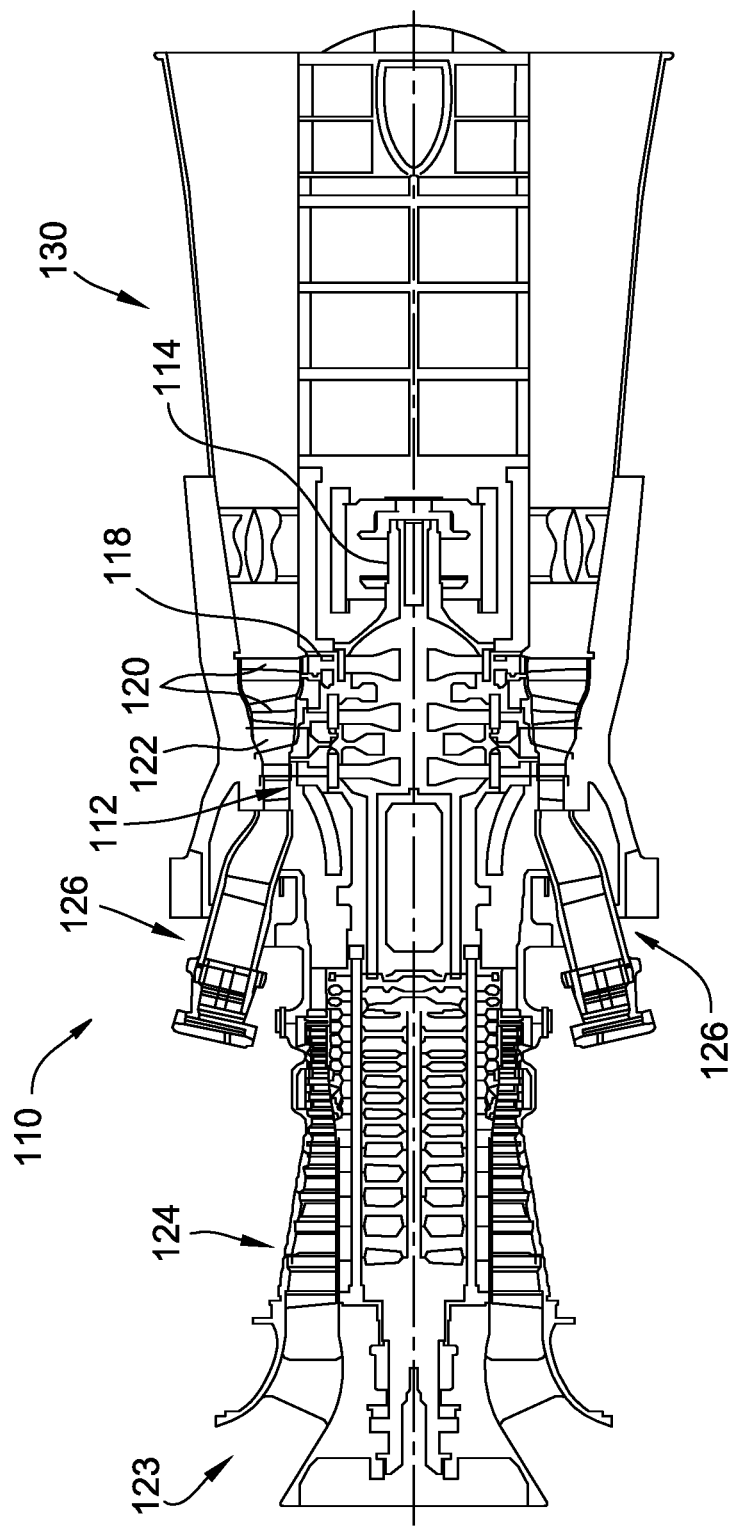
FIG. 1 is a schematic view of an exemplary rotary machine.

Corresponding reference numerals used throughout the drawings indicate corresponding parts. Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

The embodiments described herein provide methods of manufacturing (e.g., reconditioning) components used in rotary machines such as, for example, blades used in turbine engines. The turbine blades include a tip shroud and a first pre-sintered preform (PSP) attached (e.g., brazed or welded) to the tip shroud. A datum surface is formed (e.g., machined) in the tip shroud such that the datum surface is oriented substantially parallel to an external surface defined by the first PSP. The datum surface is used as a reference point for machining PSPs subsequently attached to the tip shroud. In particular, the datum surface is located a distance from the external surface defined by the first PSP. This distance is determined (e.g., may be predetermined, fixed, or determined in-situ). The first PSP is then removed during a reconditioning process, for example, in instances where the turbine blade was previously used during operation of the turbine engine and the first PSP experienced operational wear. A second PSP is then coupled to the tip shroud at the same location as the removed first pre-sintered preform. The second PSP is subsequently machined to a targeted profile such that the second PSP defines an external surface for the component.

Advantageously, the datum surface is used as an origin (a reference point) during machining of the second PSP to facilitate machining the second PSP to a profile substantially the same as the first PSP. For example, the second PSP is machined such that an external surface defined by the second PSP substantially matches the external surface defined by the first PSP. Moreover, the external surface defined by the second PSP, after machining, is oriented substantially parallel to the datum surface and is located substantially at the same distance from the datum surface as the external surface defined by the first PSP. Compared to conventional methods of reconditioning turbine blades having a PSP attached to a tip shroud, the embodiments described herein facilitate reducing errors, and enhancing the accuracy and duplicity, in machining the PSP by using a datum surface formed in the tip shroud.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Accordingly, a value modified by a term or terms such as "about," "approximately," and "substantially" is not to be limited to the precise value specified. In at least some instances, the approximating language may correspond to the precision of an instrument for measuring the value. Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item. As used herein, the term "upstream" refers to a forward or inlet end of a rotary machine, and the term "downstream" refers to an downstream or exhaust end of the rotary machine.

As used herein, the phrases "hardface structure," "pre-sintered preform" or "PSP" refer to a structure, a component or a composition that improves wear resistance properties of a component to which the hardface structure or PSP is attached (e.g., brazed or welded). Hardface structures or pre-sintered preforms may be a sintered powder metallurgy product including a homogeneous mixture of a superalloy base material and braze alloy powders. PSP braze materials may include a superalloy. The term "superalloy" refers to an alloy having numerous excellent physical characteristics compared to conventional alloys, such as but not limited to high mechanical strength and high thermal creep deformation resistance. Example superalloys include, but are not limited to, an iron-based superalloy, a nickel-based superalloy or a cobalt-based superalloy. In some examples, PSP braze materials may include at least one of Aluminum (Al), Titanium (Ti), Chromium (Cr), Tungsten (W), Molybdenum (Mo), Rhenium (Re), Tantalum (Ta), Silicon (Si), Boron (B), or Iron (Fe), in addition to the base metal.

"X-axis," "Y-axis," and "Z-axis," as used herein refer to mutually perpendicular axes (i.e., each are orthogonal to one another) and are used to describe three-dimensional aspects or orientations. The descriptions of elements of the disclosed subject matter herein are not limited to the particular axis or axes used to describe three-dimensional orientations of the elements. Alternatively stated, the axes may be interchangeable when referring to three-dimensional aspects of the disclosed subject matter.

FIG. 1 is a schematic view of an exemplary rotary machine 110. In the exemplary embodiment, rotary machine 110 is a gas turbine engine. Alternatively, rotary machine 110 may be any other turbine engine and/or rotary machine, including, without limitation, a steam turbine engine, a gas turbofan aircraft engine, other aircraft engine, a wind turbine, a compressor, and/or a pump. In the exemplary embodiment, gas turbine 110 includes a rotor assembly 112 that includes a shaft 114 and a plurality of axially-spaced rotor wheels 118.

A plurality of rotating blades 120 are coupled to each rotor wheel 118 such that each blade 120 extends radially outward from each respective rotor wheel 118. More specifically, blades 120 are arranged in rows that extend circumferentially about each wheel 118. A plurality of stationary vanes 122 extend circumferentially around shaft 114 such that each row of stationary vanes 122 is between a pair of axially-adjacent rows of blades 120. For example, turbine 110 includes a plurality of stages that include a row of stationary vanes 122 and a row of rotating blades 120 extending from rotor wheel 118.

A compressor 124 is coupled downstream from an intake section 123, and a plurality of combustors 126 are coupled circumferentially about rotor assembly 112 such that each combustor 126 is in flow communication with compressor 124. An exhaust section 130 is coupled downstream from turbine 110. Turbine 110 is rotatably coupled to compressor 124 via shaft 114.

During operation, air at atmospheric pressure is compressed by compressor 124 and is delivered downstream to combustors 126. The air exiting the compressor is heated by adding fuel to the air and burning the resulting air/fuel mixture. The gas flow resulting from combustion of fuel in the combustion stage then expands through the turbine 110, delivering some of its energy to drive the turbine 110 and a load, such as an electrical generator.

To produce the required driving torque, turbine 110 consists of one or more stages. Each stage includes a row of the stationary vanes 122 and a row of the rotating blades 120 mounted on the rotor wheel 118. The stationary vanes 122 direct the incoming gas from the combustion stage onto the rotating blades 120 to thereby drive the rotor wheel(s) 118, and rotor shaft 114.

Figure 2:
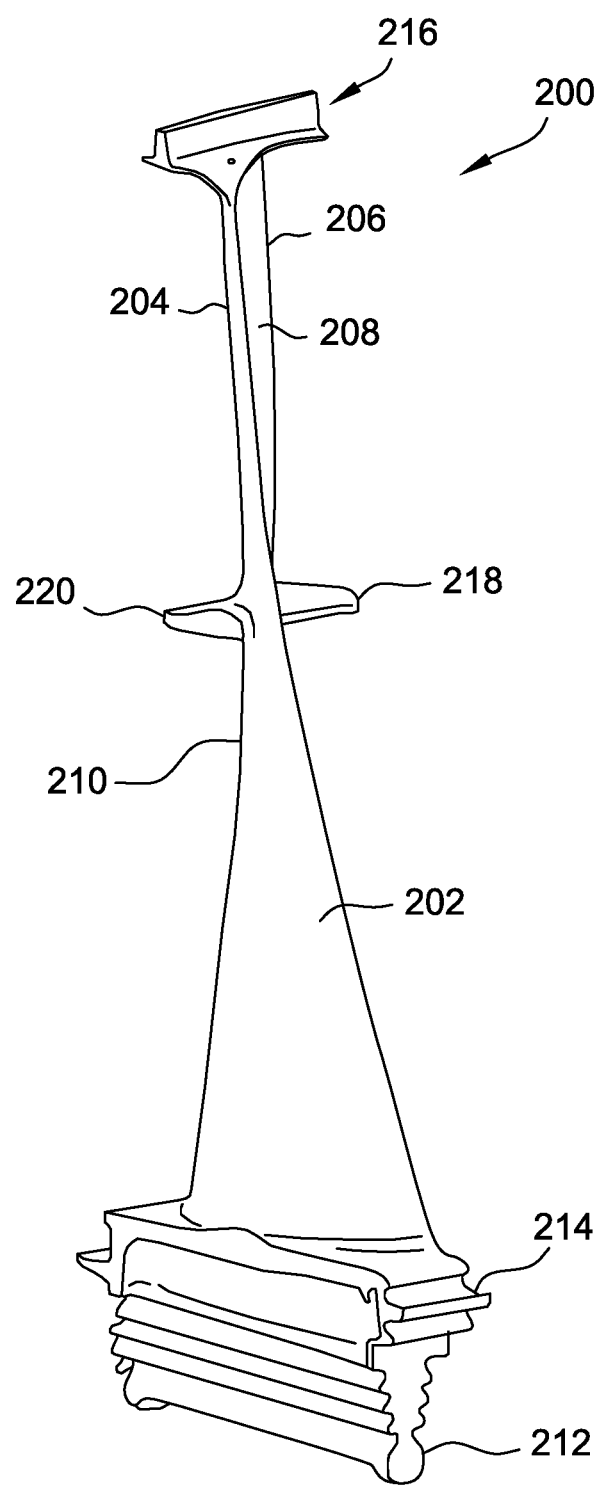
FIG. 2 is a front view of an exemplary turbine blade that may be used with the rotary machine of FIG. 1.

FIG. 2 is a front view of an exemplary turbine blade 200 that may be used with a rotary machine (e.g., as blades 120 used with rotary machine 110 shown in FIG. 1). Additionally or alternatively, the turbine blade 200 may be used with other electric turbomachines including, but not limited to, gas turbofan aircraft engines, other aircraft engines, steam turbines, wind turbines, compressors, fans, and/or pumps. In the exemplary embodiment, each turbine blade 200 in a circumferential row of the rotary machine 110 has substantially the same configuration as the other turbine blades in that row. In alternative embodiments, at least one turbine blade 200 in each row may be different from the remaining blades in that row.

The turbine blade 200 includes an airfoil portion or airfoil 202 that includes a leading edge 204 and an opposite trailing edge 206. A pressure sidewall 208 and a suction sidewall 210 each extend from the leading edge 204 to the trailing edge 206. The turbine blade 200 also includes a root 212 that enables the blade 200 to be installed in a rotary machine, for example, the rotary machine 110 (shown in FIG. 1). The root 212, for example, enables the turbine blade 200 to be coupled to the turbine rotor wheel 118 of the rotary machine 110. In the exemplary embodiment, the root 212 is in the form of a dovetail 212. The airfoil 202 and the root 212 are separated by a platform 214 which may include "angel-wing" seals (not shown).

The airfoil 202 extends between the platform 214 and a tip shroud 216 fixedly coupled to a radially outer end of the airfoil 202 opposite the platform 214. The pressure sidewall 208 is a generally concave surface, and the suction sidewall 210 is a generally convex surface. As a result, the airfoil 202 has an arcuate contour. A curvature of the pressure and suction sidewalls 208, 210 that defines the arcuate contour of the airfoil 202 may vary depending on the particular turbine and stage in which the airfoil 202 is intended for use. The present disclosure is not limited to any particular geometry of the airfoil 202, and the embodiments disclosed herein are suitable for use with airfoils 202 of various geometries.

The airfoil 202 also includes a pair of part-span shrouds 218 and 220 that facilitate tuning and/or damping vibrational characteristics of the airfoil 202 during operation. The part-span shrouds 218 and 220 extend outward in a mirrored relationship away from the airfoil 202. More specially, shroud 218 extends outwardly from the airfoil pressure sidewall 208 and shroud 220 extends outwardly from the airfoil suction sidewall 210. In the exemplary embodiment, the part-span shrouds 218 and 220 extend outwardly from the respective sidewall 208 and 210 at the same radial span. The part-span shrouds 218 and 220 of the turbine blades 200 in each circumferential row at each stage of the rotary machine 110 may be substantially circumferentially-aligned such that each of the shrouds 218 and 220 extends outwardly from the respective airfoil 202 at the same radial span location. Alternatively, the shrouds 218 and 220 may extend outwardly from the respective airfoil 202 at different radial span locations. The part-span shrouds 218 and 220 may have the same size and shape, each extending an equal axial distance from the respective sidewall 208 and 210 or, alternatively, the shrouds 218 and 220 may shaped and/or sized differently from each other.

As indicated above, the turbine blade 200 includes the tip shroud 216 attached to the radially outer end of the airfoil 202. The tip shroud 216 may alternatively be integral with the airfoil 202. The tip shroud 216 may generally define the radially outermost portion of the blade 200 and the tip shroud 216 provides a surface area that runs substantially perpendicular to the airfoil 202 such that it caps or covers the tip of the airfoil 202. During operation, the tip shroud 216 engages at opposite ends the two adjacent tip shrouds 216 of the adjacent blades 200 such that an approximate annular ring or shroud circumscribing the hot gas path at the location of the stage of blades 200 is formed. This annular ring holds the expanding gases of the hot path on the airfoil 202 (i.e., it does not allow the gases to slide over the end of the airfoil blade) so that a greater percentage of energy from the working fluid may be converted into mechanical energy by the turbine blades. Tip shrouds, thusly, generally improve the performance of gas turbines.

FIGS. 3 and 4 illustrate the tip shroud 216 in greater detail. As shown, the tip shroud 216 includes a sealing rail 222 extending between a first end 224 and a second end 226 of the tip shroud. Alternate embodiments may include more sealing rails 222 (e.g., two sealing rails 222, three sealing rails 222, etc.) or no sealing rails 222 at all. As understood in the art, the sealing rail 222 may have any of a variety of cooling passages (not shown) extending therethrough to cool the tip shroud 216.

The tip shroud 216 also includes a radially outer surface 228 that lies in an X-Y plane that contains an X-axis and a Y-axis. The sealing rail 222 extends radially outward from the radially outer surface 228 in a direction of a Z-axis. The radially outer surface 228 spans across a leading edge portion 230 of the tip shroud 216 and a trailing edge portion 232 of the tip shroud 216. The periphery of the leading edge portion 230 is surrounded by a leading edge wall 234. The periphery of the trailing edge portion 232 is surround by a trailing edge wall 236. Each of the leading edge wall 234 and the trailing edge wall 236 extend downward from the radially outer surface 228. The leading edge portion 230 of the tip shroud 216 is fixedly coupled to the leading edge 204 of the airfoil 202. The trailing edge portion 232 of the tip shroud 216 is fixedly secured to the trailing edge 206 of the airfoil 202.

As shown in FIGS. 3 and 4, the blade 200 also includes hardface structures attached to the tip shroud 216. The hardface structures in the exemplary embodiment are pre-sintered preform structures 238 and 240, otherwise referred to herein as pre-sintered preforms 238 and 240, or PSP 238 and PSP 240. The PSP 238 is coupled (e.g., brazed or welded) to the first end 224 of the tip shroud 216 and the PSP 240 is coupled (e.g., brazed or welded) to the second end 226 of the tip shroud 216. Each PSP 238 and 240 serves as a wear component to facilitate improving the wear properties of the tip shroud 216 at the first end 224 and the second end 226, respectively, and thus facilitates extending the useful life of the associated blade 200. In particular, the PSP 238 and PSP 240 attached to the respective ends 224 and 226 facilitates protecting the tip shroud 216 at these locations from wear arising from frictional contact during operation, when the tip shroud 216 is exposed to centrifugal, pressure, thermal, and vibratory loading. In some embodiments, each of the PSP 238 and the PSP 240 is coupled to the first end 224 and the second end 226, respectively, by brazing.

The PSP 238 and the PSP 240 each have a suitable predetermined geometry when attached to the respective end 224 and 226 of the tip shroud 216. For example, the PSP 238 and the PSP 240 have substantially the same geometric shape as the respective end 224 and 226, and cover the sealing rail 222 at the respective end 224 and 226. When attached, the PSP 238 and the PSP 240 each define an external surface 242 and 244, respectively. The external surfaces 242 and 244 extend substantially parallel to one another, and substantially perpendicular to the radially outer surface 228. As such, the external surfaces 242 and 244 each lie in a Z-Y plane that contains the Z-axis and the Y-axis. The PSP 238 and the PSP 240 also have a suitable thickness, measured as a distance in the X-axis direction extending between the respective external surface 242 and 244 and the respective end 224 and 226 to which the PSP 238 and PSP 240 is attached.

The PSP 238 and the PSP 240 may be machined after being attached to the respective end 224 and 226 to ensure that the respective external surface 242 and 244 is substantially planar and to remove excess material from the PSP 238 and the PSP 240. Machining the PSP 238 and the PSP 240 may be performed using any now known or later developed machining process, such as, but not limited to, electro-discharge machining (EDM), wire EDM, grinding, laser cutting, and the like. The machining tool (e.g., the machining tool 602 in FIG. 6) is operatively coupled to a motion device (e.g., the computer numerical control unit 604 in FIG. 6) in communication with a controller (e.g., the controller 610 in FIG. 6). The motion device may be a gantry system, computer numerical control (CNC) machine, Cartesian robot, or other suitable system that facilitates multi-axis movement of the machining tool. The controller is used to control multi-axis movement of the motion device to guide a tool path of the machining tool. As the description proceeds, the motion device may also be referred to as a CNC unit or CNC system.

During operation, the PSP 238 and the PSP 240 may deteriorate or degrade due to exposure to loading (e.g., mechanical, vibrational, and/or thermal loads). Reconditioning of the blade 200 may include replacing one or both of the PSP 238 and/or the PSP 240 with a new PSP 238 and/or a new PSP 240. In general, the original PSP 238 and/or PSP 240 is removed and the new PSP 238 and/or PSP 240 is attached (e.g., brazed or welded) to the respective end 224 and 226 of the tip shroud 216. The new PSP 238 and/or PSP 240 is then machined to a targeted profile (e.g., by planarizing the respective external surface 242 and 244 and removing excess material).

During machining of the new PSP 238 and/or PSP 240, movement of the motion device operatively coupled to the machining tool is guided by a coordinate system. In particular, the targeted profile of the PSP 238 and/or the PSP 240 translates to coordinate values within an X-, Y-, and Z-Cartesian coordinate system with reference to the X-axis, the Y-axis, and the Z-axis and relative to an origin within the coordinate system. As an example, the external surface 242 and/or the external surface 244 is machined according to Z and Y coordinate values at a fixed X coordinate value, relative to an origin. By defining X, Y, and Z coordinate values for the PSP 238 and/or the PSP 240, the targeted profile of the PSP 238 and/or the PSP 240 is ascertained with an increased accuracy, and the motion device operatively coupled to the machining tool is guided accordingly.

Figure 5:
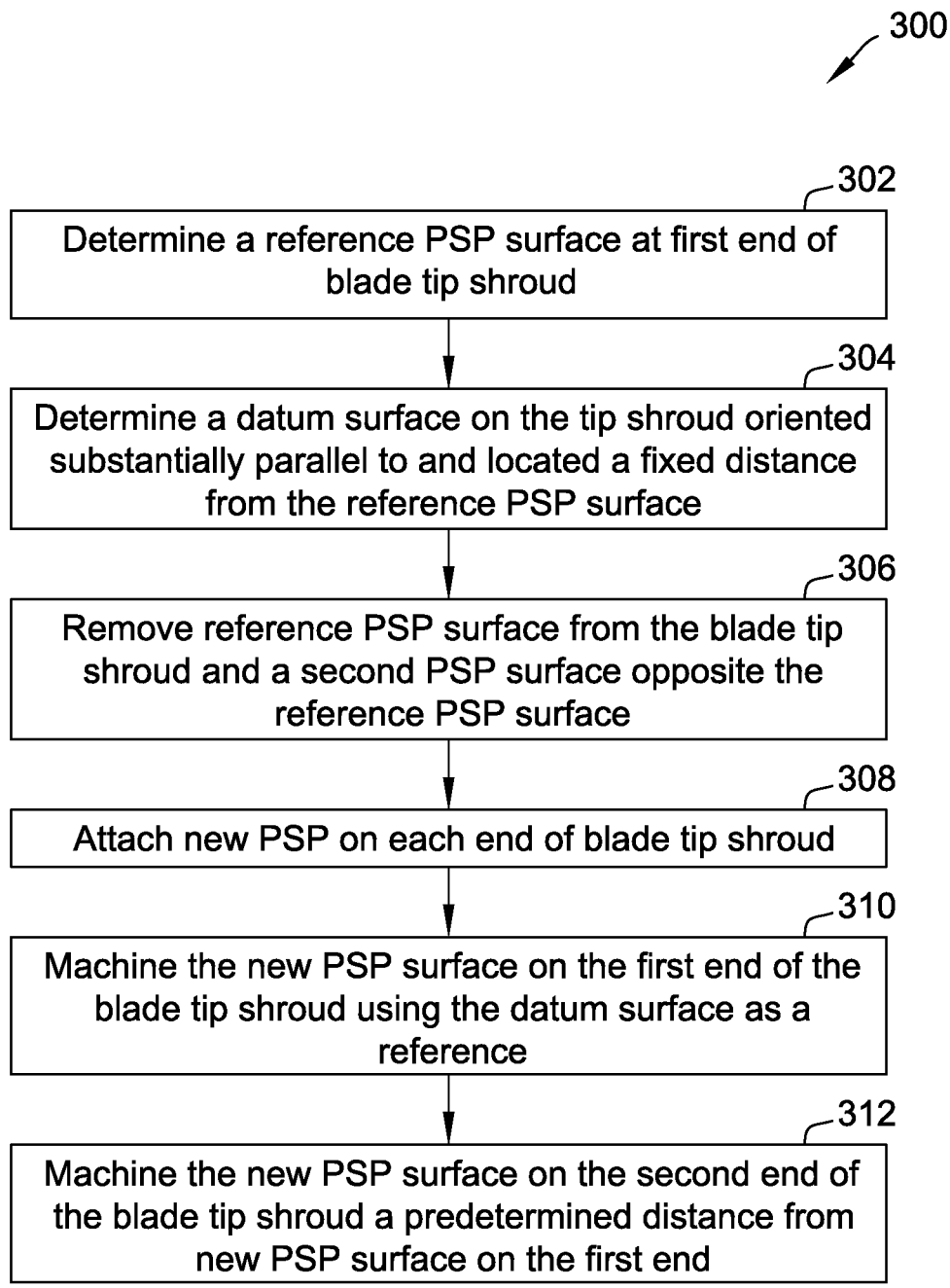
FIG. 5 shows an exemplary process of manufacturing a turbine blade that includes a pre-sintered preform attached to the tip shroud of FIGS. 3 and 4.

With additional reference to FIG. 5, a method 300 of manufacturing (e.g., reconditioning) the turbine blade 200 (shown in FIG. 2) having the tip shroud 216 (shown in FIGS. 3 and 4) is shown. Although the method 300 will be described in the context of reconditioning the turbine blade 200, it will be appreciated that the method 300 may be used in initial fabrication of the turbine blade 200 (e.g., before the turbine blade 200 has been used with the turbine engine 110 during operation).

Figure 6:
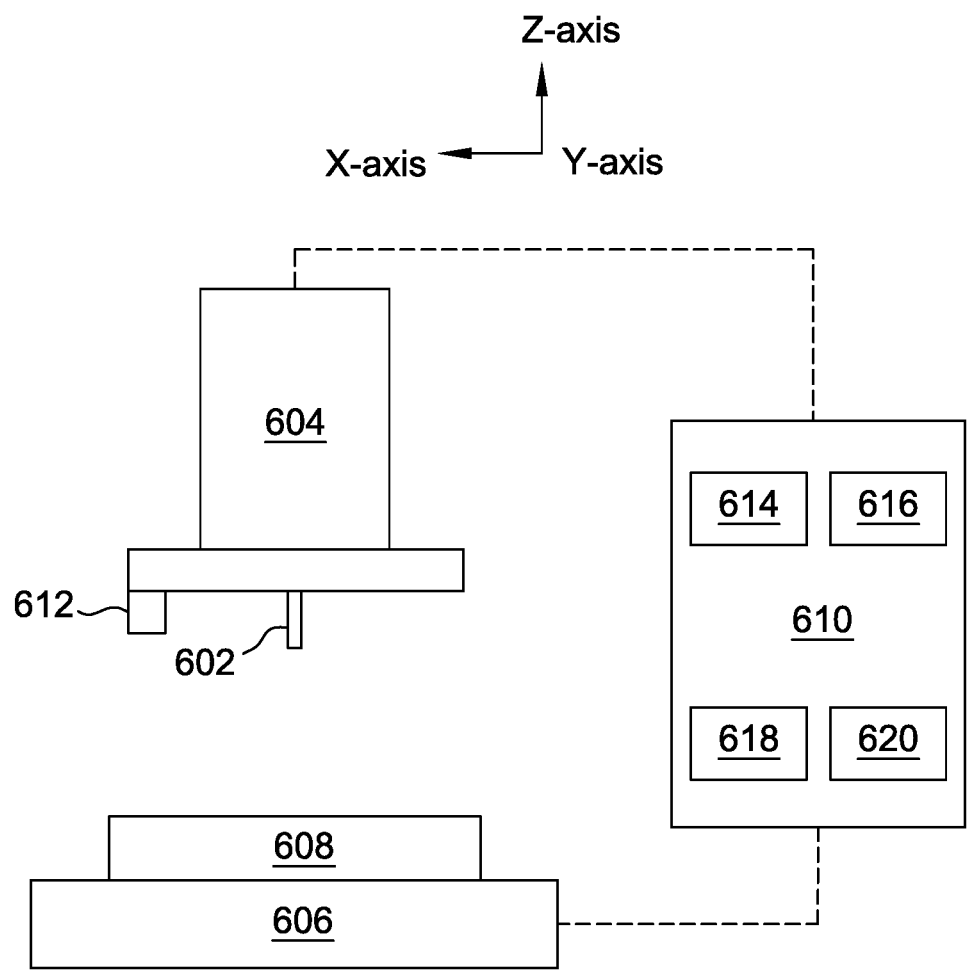
FIG. 6 shows a schematic of an exemplary system for performing the process of FIG. 5.

The method 300 may be performed using a system 600 (FIG. 6) that includes a machining tool (e.g., the machining tool 602 in FIG. 6) operatively coupled to a multi-axis computer numerically controlled (CNC) unit (e.g., the CNC unit 604 in FIG. 6). The system 600 may be referred to herein as a CNC system. In various embodiments, the machining tool 602 may be, for example, an electro-discharge machining (EDM) tool, a wire EDM tool, a grinding tool, a laser cutting tool, and the like. The CNC systems used with machining tools are known in the art, and described, for example, in U.S. Pat. No. 7,351,290 B2 (S. Rutkowski et al.) which is incorporated herein by reference in its entirety. CNC units (e.g., the unit 604) facilitate movement of the machining tool (e.g., the machining tool 602) along a number of the X-, Y-, and Z-axes.

The method 300 will be described with additional reference to the system 600 shown in FIG. 6 that includes the machining tool 602 operably coupled to the CNC unit 604. To initiate the method 300, the turbine blade 200 is loaded onto i.e., set up within, the CNC unit 604. For example, the turbine blade 200 may be loaded onto a work support 606 of the CNC unit 604. The turbine blade 200 loaded onto the work support is schematically represented in FIG. 6 by the workpiece 608 positioned on the work support 606.

The CNC unit 604 is operable to move the machining tool 602 relative to the workpiece 608 along one or more of the X-, Y-, and Z-axes. The work support 606 may also be operable to move the workpiece about or along one or more axes relative to the machining tool 602. A sensor 612 (e.g., a contact probe, camera, or tool sensor) is mounted within the system 600 (e.g., on the CNC unit 604) for calibrating and/or positioning the machining tool 602 relative to the workpiece 608. One or more sensors 612 may be included and mounted in the system 600 to enable the system to function as described herein.

In the exemplary embodiment, the system 600 includes the controller 610 communicatively coupled to the machining tool 602, the CNC unit 604, the work support 606, and the sensor 612. The controller 610 may communicate with one of more of these components via a communication interface coupled in communication with one or more of these devices. The communication interface may include, without limitation, a wired network adapter, a wireless network adapter, a mobile telecommunications adapter, a serial communication adapter, or a parallel communication adapter. The communication interface may receive a data signal from, or transmit a data signal to, one or more remote devices, such as the machining tool 602, the CNC unit 604, the work support 606, and/or the sensor 612.

The controller 610 is operable to control components of the system 600 (e.g., the machining tool 602, the CNC unit 604, the work support 606, and the sensor 612) by executing, via a processor 614, instructions stored in a memory device 616 that is communicatively coupled to the processor 614. The processor 614 may include one or more processing units, such as, for example, a multi-core configuration. The memory device 616 is one or more devices that enable storage and retrieval of information such as executable instructions or other data. The memory device 616 may include one or more computer readable media, for example, and without limitation, random access memory (RAM), dynamic RAM, static RAM, a solid-state disk, a hard disk, read-only memory (ROM), erasable programmable ROM, electrically erasable programmable ROM, or non-volatile RAM memory. The above memory types are exemplary only, and are thus not limiting as to the types of memory usable for storage of a computer program.

The processor 614 may be programmed by encoding an operation as one or more executable instructions and providing the executable instructions in the memory device 616. In various embodiments, the processor 614 may be programmed to coordinate and control movement of the CNC unit 604, the machining tool 602, and/or the work support 606 in any one or a combination of the X-, Y-, and Z-axes. In this regard, the processor 614 may be programmed to control multi-axis movement of the machining tool 602 relative to the workpiece 608. The processor 614 may adjust the power settings of the machining tool 602, including, for example, by adjusting the amount of force (e.g., mechanical and/or electrical) exerted by the machining tool 602 on the workpiece 608.

The memory device 616 may store data associated with the operation of the system 600 including, without limitation, real-time and historical operating parameter values, or any other type of data. The memory device 616 may store instructions that are executable by the processor 614 to control the CNC unit 604, the work support 606, and/or the machining tool 602 based, for example, on a desired geometry of the workpiece 608. The desired geometry of the workpiece 608 may be defined by a three-dimensional drawing file (e.g., obtained from a CAD/CAM program) stored in the memory device 616. In some embodiments, the memory device 616 may include, without limitation, sufficient data, algorithms, and commands to enable the processor 614 to control components of the system 600 to function as described herein.

In some embodiments, the controller 610 includes a presentation interface 618 coupled to the processor 614. The presentation interface 618 presents information, such as a user interface, to an operator of the system 600. In one embodiment, the presentation interface 618 includes a display adapter (not shown) that is coupled to a display device (not shown), such as a cathode ray tube (CRT), a liquid crystal display (LCD), an organic LED (OLED) display, or an "electronic ink" display. In some embodiments, the presentation interface 618 includes one or more display devices. In addition, or alternatively, presentation interface 618 includes an audio output device (not shown), for example, without limitation, an audio adapter, a speaker, or a printer (not shown).

In some embodiments, the controller 610 includes a user input interface 620. In the exemplary embodiment, the user input interface 620 is coupled to the processor 614 and receives input from the operator. The user input interface 612 may include, for example, and without limitation, a keyboard, a pointing device, a mouse, a stylus, a touch sensitive panel, such as, without limitation, a touch pad or a touch screen, and/or an audio input interface, such as, without limitation, a microphone. A single component, such as a touch screen, may function as both a display device of the presentation interface 618 and the user input interface 620.

The method 300 includes identifying or determining 302 an initial reference surface (first origin) for the controller 610 in order to control movement of the machining tool 602 (e.g., via the CNC unit 604). For the controller 610 to control movement of the machining tool 602 as accurately as possible, it is necessary for the controller to know the location of the machining tool with great precision. The sensor 612 may be used determine the reference surface, and the reference surface may then be processed by the controller 610 to control movement of the machining tool 602 via the CNC unit 604. The sensor 612 used to determine the reference surface may be a contact probe, for example. The position of the machining tool 602 can be calibrated against such a probe by noting the probing axis scale position when contact with the probe occurs. From the observed deviations between the programmed and actual positions, a compensating offset may be determined and stored in the memory device 616 of the controller 610. The offset compensates for the difference between the programmed contact position of the machining tool 602 and the actual contact position.

In the exemplary method 300, determining 302 the initial reference surface includes probing an external surface of the workpiece 608 at a region to be machined. For example, the sensor 612 may be used to probe the external surface of a PSP of the turbine blade 200 that is to be removed and replaced during the reconditioning of the turbine blade (e.g., the external surface 242 of the PSP 238 or the external surface 244 of the PSP 240). The probed surface is set as the origin to calibrate, by the controller 610, the position of the machining tool 602 (and predetermined offsets may be applied at this stage as well if applicable).

The method 300 also includes identifying or determining 304 a datum surface on the workpiece 608. For example, the datum surface may be defined in the tip shroud 216. The datum surface may be formed (e.g., machined) in the tip shroud 216 prior to initiating the method, or the datum surface may be formed (e.g., machined using the machining tool 602) during the method 300. The datum surface may be identified or determined 304 using the sensor 612 (e.g., by probing the datum surface), and this information may be processed by the controller 610 for controlling the machining tool 602.

In the exemplary method 300, the datum surface is formed in the tip shroud 216 and is oriented substantially parallel to the external surface of the PSP (e.g., the PSP 238 or PSP 240) probed when determining 302 the reference surface. Referring back to FIGS. 3 and 4, in the exemplary embodiment, the datum surface is a notch 246 formed in the leading edge wall 234. The notch 246 defines a surface that is oriented substantially parallel to the external surface 244 of the PSP 240. The external surface 244 of the PSP 240 serves as the initial reference surface that was previously probed when determining 302 the reference surface.

Determining 304 the datum surface also includes determining the distance $D_1$, measured in the X-axis direction, between the notch 246 and the external surface 244 of the PSP 240. The distance $D_1$ may be used by the controller 610 to control the machining tool 602 in subsequent machining, described below. The distance $D_1$ may be, for example, between about 3 inches to about 5 inches, or such as between about 4.0 inches to about 4.2 inches. The distance $D_1$ may vary depending on the component that is being repaired by the process 300 and the relative dimensions of the component. The notch 246 being oriented substantially parallel to the external surface 244 and the distance $D_1$ being determined between the notch 246 and the external surface 244 ensures that a spatial relationship between the notch 246 and a new PSP 240 is readily determined by the controller 610 for controlling the machining tool 602 to machine the new PSP 240 to a targeted profile, as described below. It will be appreciated that, in alternate embodiments, the external surface 242 of the PSP 238 may be probed when the reference surface is determined 302, as the initial reference surface and a notch (not shown) may be formed in the trailing edge wall 236 and subsequently determined 304 as the datum surface.

In some embodiments, determining 304 the datum surface includes machining the datum surface (e.g., the notch 246) in the tip shroud 216 after determining 302 the initial reference surface. The datum surface may be machined a predetermined or pre-defined distance $D_1$ from the determined 302 reference surface. For example, after determining 302 the reference surface, the machining tool 602 may be controlled, via controller 610 and the CNC unit 604, to machine the datum surface (e.g., the notch 246) in the tip shroud 216 the distance $D_1$ from the initial reference surface (e.g., the external surface 244 of the PSP 240). Alternatively, the datum surface may be machined in the tip shroud 216 and the distance $D_1$ between the datum surface (e.g., the notch 246) and the initial reference surface (e.g., the external surface 244) may subsequently be determined (e.g., by probing the datum surface and measuring the distance $D_1$).

The method 300 continues with removing 306, from the tip shroud, the PSP that defines the external surface previously probed when the reference surface was determined 302. The PSP may be removed 306 from the tip shroud using the machine tool 602 or by another suitable means. In the exemplary method 300, the PSP 240 that defines the external surface 244 previously probed when the reference surface was determined 302 is removed 306. The PSP 238 that defines the external surface 242 may also be removed 306 in some examples. Because the external surface 242 of the PSP 238 is located a known or pre-determined distance $D_2$ from the external surface 244 of the PSP 240, measured in the direction of the X-axis, and because the external surfaces 242 and 244 are oriented substantially parallel to one another, additional probing of the external surface 242 is not required prior to removing the PSP 238 as the spatial relationship between the external surfaces 242 and 244 is known (e.g., stored in the memory device 616). For example, the distance $D_2$ may be defined by a three-dimensional drawing file stored in the memory device 616. After the PSP 240 is removed 306 and, optionally, the PSP 238, a new PSP 240 is attached 308 (e.g., brazed or welded) to the second end 226 of the tip shroud 216 and, optionally, a new PSP 238 is attached (e.g., brazed or welded) to the first end 224 of the tip shroud 216.

The method 300 continues with machining 310, using the machining tool 602 operatively coupled to the controller 610, the new PSP 240 that is attached 308 to the tip shroud 216 to a targeted profile. The targeted profile translates to coordinate values that are readily determined by the controller 610 by reference to the datum surface (e.g., the notch 246) in the tip shroud 216. Specifically, the targeted profile of the PSP 240 attached 308, substantially matches the targeted profile of the PSP 240 previously removed 306. As above, the targeted profile translates to coordinate values, and these values are readily ascertained by the controller 610 using the datum surface (e.g., the notch 246) as an origin (a reference point) for machining 310. For example, after the PSP 240 is attached 308 and machined 310, the PSP 240 defines an external surface 244 that substantially matches the external surface 244 defined by the PSP 240 previously removed 306. That is, the external surface 244 of the PSP 240 when attached 310 is oriented substantially parallel to the datum surface (e.g., the notch 246) and located the precise distance $D_1$ from the datum surface. In this regard, the targeted profile (e.g., the planarization of the external surface 244) of the PSP 240 previously attached 308 is readily ascertained by probing (e.g., using the sensor 612) the datum surface (e.g., the notch 246) and using the datum surface as the origin during machining 310. A new PSP 238, if previously attached 308, may be machined 312 using the distance $D_2$ measured between the external surfaces 242 and 244 of the PSP 238 and the PSP 240, respectively, that were previously removed 306. A blend-to-finish operation may subsequently be performed on the PSP 240 previously attached 310 and the PSP 238 optionally attached 312 to smooth these newly added components and achieve a finished tip shroud 216 for use with subsequent operation of the rotary machine 110.

Compared to conventional methods of reconditioning turbine blades have a tip shroud with one or more PSP structures, the above-described embodiments present several advantages. For example, in conventional processes, portions of the blade (e.g., part-span shrouds) may be used as reference points for machining PSPs attached to the tip shroud. These reference points are in different locations from the tip shroud, and the coordinate system used to guide the machining tool must be transformed based on rotation and/or translation of the tip shroud relative to the part-span shrouds. These processes also requires data saving to enable transformation of the coordinate system based on these reference points once a new PSP is attached to the tip shroud. These conventional processes are limited by relying on reference points that are not located on the portion of the component to which the PSP is applied, deriving translational and rotational movement from coordinate system transformation that requires hitting the same location at initial and final machining, and data saving. Errors in machining the hardface PSP may be amplified due to indirect locating, multiple probing, transformation, as well as data saving.

The above-described embodiments overcome the limitations and disadvantages of these conventional processes by forming a datum surface in the tip shroud that is located a known or fixed distance from a new PSP attached to the tip shroud during manufacture and/or reconditioning. The datum surface is used as an origin in determining coordinate values for subsequent machining of the new PSP (e.g., by forming an external surface oriented parallel to the datum surface and located the known or fixed distance therefrom). Advantages of the present embodiments include reducing or eliminating data saving from the machining process, and reducing probing and coordinate system transformation from different locations on the turbine blade. These are achieved by using a fixed distance origin measured at the tip shroud level (e.g., using a datum surface having a Z-axis coordinate at the Z-axis coordinate level of the new PSP). Moreover, because the embodiments described herein use plane to plane measurement, a coordinate measuring machine (CMM) and hard gauge can be relied on for in-process inspection.

Further aspects of the present disclosure are provided by the subject matter of the following clauses:

Clause 1. A method of repairing a turbine blade that includes a tip shroud and a first pre-sintered preform (PSP) attached to the tip shroud, the method comprising: positioning the turbine blade within a system including a machining tool; determining a first distance between a surface of the first PSP and a datum surface formed in the tip shroud; removing the first PSP from the tip shroud; coupling a second PSP to the tip shroud; and machining a surface of the second PSP using the machining tool, wherein machining the second PSP surface comprises controlling movement of the machining tool using the datum surface as a reference, such that the machined second PSP surface is located the first distance from the datum surface.

Clause 2. The method of Clause 1, further comprising machining, using the machining tool, the datum surface in the tip shroud such that the datum surface is located the first distance from the first PSP surface.

Clause 3. The method of any one of preceding clauses, wherein determining the first distance comprises machining the datum surface in the tip shroud and measuring a distance between the datum surface and the first PSP surface.

Clause 4. The method of any one of preceding clauses, wherein determining the first distance comprises determining a pre-defined first distance and machining the datum surface in the tip shroud the pre-defined first distance from the first PSP surface.

Clause 5. The method of any one of preceding clauses, wherein coupling the second PSP to the tip shroud comprises coupling the second PSP and the tip shroud securely together by one of brazing and welding.

Clause 6. The method of any one of preceding clauses, further comprising coupling a third PSP to the tip shroud and, after machining the second PSP surface, machining a surface of the third PSP to a second distance measured between the machined second PSP surface and the machined third PSP surface.

Clause 7. The method of any one of preceding clauses, wherein machining the third PSP surface to the second distance comprises machining the third PSP surface to a pre-defined second distance measured between the machined second PSP surface and the machined third PSP surface.

Clause 8. A method of repairing a turbine component including a first hardface structure and a second hardface structure, the method comprising: positioning the turbine component within a system including a machining tool; determining a first distance between a surface of the first hardface structure and a datum surface formed in the turbine component; removing the first and second hardface structures from the turbine component; coupling a third hardface structure to the turbine component and a fourth hardface structure to the turbine component; machining a surface of the third hardface structure using the machining tool, wherein machining the third hardface structure surface comprises controlling movement of the machining tool using the datum surface as a reference, such that the machined third hardface structure surface is located the first distance from the datum surface; and machining, using the machining tool, a surface of the fourth hardface structure to a second distance measured between the machined third hardface structure surface and the machined fourth hardface structure surface.

Clause 9. The method of any one of preceding clauses, wherein machining the fourth hardface structure surface comprises machining the fourth hardface structure surface to the second distance that is substantially equal to a distance measured between the first hardface structure surface and a surface of the second hardface structure.

Clause 10. The method of any one of preceding clauses, wherein machining the fourth hardface structure surface to the second distance comprises machining the fourth hardface structure surface to a pre-defined second distance measured between the machined third hardface structure surface and the machined fourth hardface structure surface.

Clause 11. The method of any one of preceding clauses, further comprising machining, using the machining tool, the datum surface in the turbine component, wherein machining the datum surface in the turbine component comprises controlling movement of the machining tool using the first hardface structure surface as a reference.

Clause 12. The method of any one of preceding clauses, wherein determining the first distance comprises machining the datum surface in the turbine component and measuring a distance between the datum surface and the first hardface structure surface.

Clause 13. The method of any one of preceding clauses, wherein determining the first distance comprises determining a pre-defined first distance and machining the datum surface in the turbine component the pre-defined first distance from the first hardface structure surface.

Clause 14. The method of any one of preceding clauses, wherein coupling the first and second hardface structures to the turbine component comprises coupling each of the first and second hardface structures securely to the turbine component by one of brazing and welding.

Clause 15. A method of repairing a turbine blade that includes a tip shroud, and a first pre-sintered preform (PSP) and a second PSP attached to the tip shroud, the method comprising: positioning the turbine blade within a system including a machining tool; controlling the machining tool to machine a datum surface in the tip shroud; removing the first and second PSPs from the tip shroud; coupling a third PSP and a fourth PSP to the tip shroud; controlling the machining tool to machine the third PSP using the datum surface as a reference; and controlling the machining tool to machine the fourth PSP after machining the third PSP.

Clause 16. The method of any one of preceding clauses, wherein controlling the machining tool to machine the datum surface comprises controlling the machining tool to machine the datum surface using a surface of the first PSP as a reference.

Clause 17. The method of any one of preceding clauses, wherein controlling the machining tool to machine the datum surface comprises controlling the machining tool to machine the datum surface a first distance from the first PSP surface.

Clause 18. The method of any one of preceding clauses, wherein controlling the machining tool to machine the third PSP comprises controlling the machining tool to machine the third PSP using the datum surface as a reference and based on the first distance.

Clause 19. The method of any one of preceding clauses, wherein controlling the machining tool to machine the third PSP comprises controlling the machining tool to machine the third PSP to the first distance from the datum surface.

Clause 20. The method of any one of the preceding clauses, wherein controlling the machining tool to machine the fourth PSP comprises controlling the machining tool to machine the fourth PSP based on a distance between the first and second PSPs.

Exemplary embodiments of turbine blades and methods of manufacturing and repairing turbine blades, are described above in detail. The present disclosure is not limited to the specific embodiments described herein, but rather, components of systems may be utilized independently and separately from other components described herein. For example, the methods as disclosed herein may be used in combination with rotary components other than those specifically described herein, and the turbine blades may also be used in combination with other rotary machines and methods, and are not limited to practice with only the gas turbine engine or steam turbine engine assemblies as described herein. Rather, the exemplary embodiment can be implemented and utilized in connection with many other rotary machine applications.

Although specific features of various embodiments of the invention may be shown in some drawings and not in others, this is for convenience only. Moreover, references to "one embodiment" in the above description are not intended to be interpreted as excluding the existence of additional embodiments that also incorporate the recited features. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of repairing a turbine component including a first hardface structure and a second hardface structure, the method comprising:
   positioning the turbine component within a system including a machining tool;
   determining a first distance between a surface of the first hardface structure and a datum surface formed in the turbine component;
   removing the first and second hardface structures from the turbine component;
   coupling a third hardface structure to the turbine component and a fourth hardface structure to the turbine component;
   machining a surface of the third hardface structure using the machining tool, wherein machining the third hardface structure surface comprises controlling movement of the machining tool using the datum surface as a reference, such that the machined third hardface structure surface is located the first distance from the datum surface; and
   machining, using the machining tool, a surface of the fourth hardface structure to a second distance measured between the machined third hardface structure surface and the machined fourth hardface structure surface.

2. The method of claim 1, wherein machining the fourth hardface structure surface comprises machining the fourth hardface structure surface to the second distance that is substantially equal to a distance measured between the first hardface structure surface and a surface of the second hardface structure.

3. The method of claim 1, wherein machining the fourth hardface structure surface to the second distance comprises machining the fourth hardface structure surface to a pre-defined second distance measured between the machined third hardface structure surface and the machined fourth hardface structure surface.

4. The method of claim 1, further comprising machining, using the machining tool, the datum surface in the turbine component, wherein machining the datum surface in the turbine component comprises controlling movement of the machining tool using the first hardface structure surface as a reference.

5. The method of claim 1, wherein determining the first distance comprises machining the datum surface in the turbine component and measuring a distance between the datum surface and the first hardface structure surface.

6. The method of claim 1, wherein determining the first distance comprises determining a pre-defined first distance and machining the datum surface in the turbine component the pre-defined first distance from the first hardface structure surface.

7. The method of claim 1, wherein coupling the first and second hardface structures to the turbine component comprises coupling each of the first and second hardface structures securely to the turbine component by one of brazing and welding.

* * * * *